US009191963B2

(12) United States Patent
Park et al.

(10) Patent No.: US 9,191,963 B2
(45) Date of Patent: Nov. 17, 2015

(54) CARRIER AGGREGATION APPARATUS FOR EFFICIENTLY UTILIZING FREQUENCY RESOURCE OF LICENSE BAND AND SHAREABLE BANDS, AND OPERATION METHOD THEREOF

(71) Applicant: Electronics and Telecommunications Research Institute, Daejeon (KR)

(72) Inventors: Jae Cheol Park, Gwangju-si (KR); Sung Hyun Hwang, Daejeon (KR); Byung Jang Jeong, Daejeon (KR); Jae Hyun Park, Busan (KR); Jae Ick Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 205 days.

(21) Appl. No.: 13/898,556

(22) Filed: May 21, 2013

(65) Prior Publication Data

US 2013/0336180 A1 Dec. 19, 2013

(30) Foreign Application Priority Data

Jun. 14, 2012 (KR) .................. 10-2012-0063963
Apr. 1, 2013 (KR) .................. 10-2013-0035307

(51) Int. Cl.
| | |
|---|---|
| *H04L 27/00* | (2006.01) |
| *H04W 72/08* | (2009.01) |
| *H04L 5/00* | (2006.01) |
| *H04W 72/04* | (2009.01) |

(52) U.S. Cl.
CPC ............ *H04W 72/085* (2013.01); *H04L 5/001* (2013.01); *H04L 5/006* (2013.01); *H04L 27/0006* (2013.01); *H04W 72/087* (2013.01); *H04W 72/0453* (2013.01)

(58) Field of Classification Search
CPC .................................................. H04L 27/0006
See application file for complete search history.

(56) References Cited

U.S. PATENT DOCUMENTS

| | | | | |
|---|---|---|---|---|
| 2007/0042733 | A1* | 2/2007 | Tomioka | 455/179.1 |
| 2008/0192686 | A1* | 8/2008 | Cho et al. | 370/329 |
| 2008/0268892 | A1* | 10/2008 | Hamdi et al. | 455/522 |
| 2009/0197626 | A1* | 8/2009 | Huttunen et al. | 455/522 |
| 2010/0069013 | A1* | 3/2010 | Chaudhri et al. | 455/67.11 |
| 2010/0151876 | A1* | 6/2010 | Park et al. | 455/452.2 |
| 2012/0071189 | A1* | 3/2012 | Mody | 455/513 |
| 2013/0336175 | A1* | 12/2013 | Um et al. | 370/280 |

FOREIGN PATENT DOCUMENTS

| | | |
|---|---|---|
| KR | 1020040028445 A | 4/2004 |
| WO | WO 2012051157 A1 * | 4/2012 |

* cited by examiner

*Primary Examiner* — Hassan Kizou
*Assistant Examiner* — Deepa Belur
(74) *Attorney, Agent, or Firm* — William Park & Associates Ltd.

(57) ABSTRACT

An exemplary embodiment provides a carrier aggregation apparatus including: a level assignment manager configured to perform management by classifying a license band allocated to a cognitive radio cell into a primary radio resource (PRR) level, and by classifying a shareable band obtained through a cognitive radio database or spectrum sensing into an auxiliary radio resource (ARR) level; a determiner configured to determine a quality of service (QoS) level of a communication service provided to the cognitive radio cell; and a service provider configured to allocate a frequency resource of the PRR level when the QoS level requires a first communication service, and to allocate a frequency resource of the ARR level when the QoS level requires a second communication service lower than the first communication service.

20 Claims, 3 Drawing Sheets

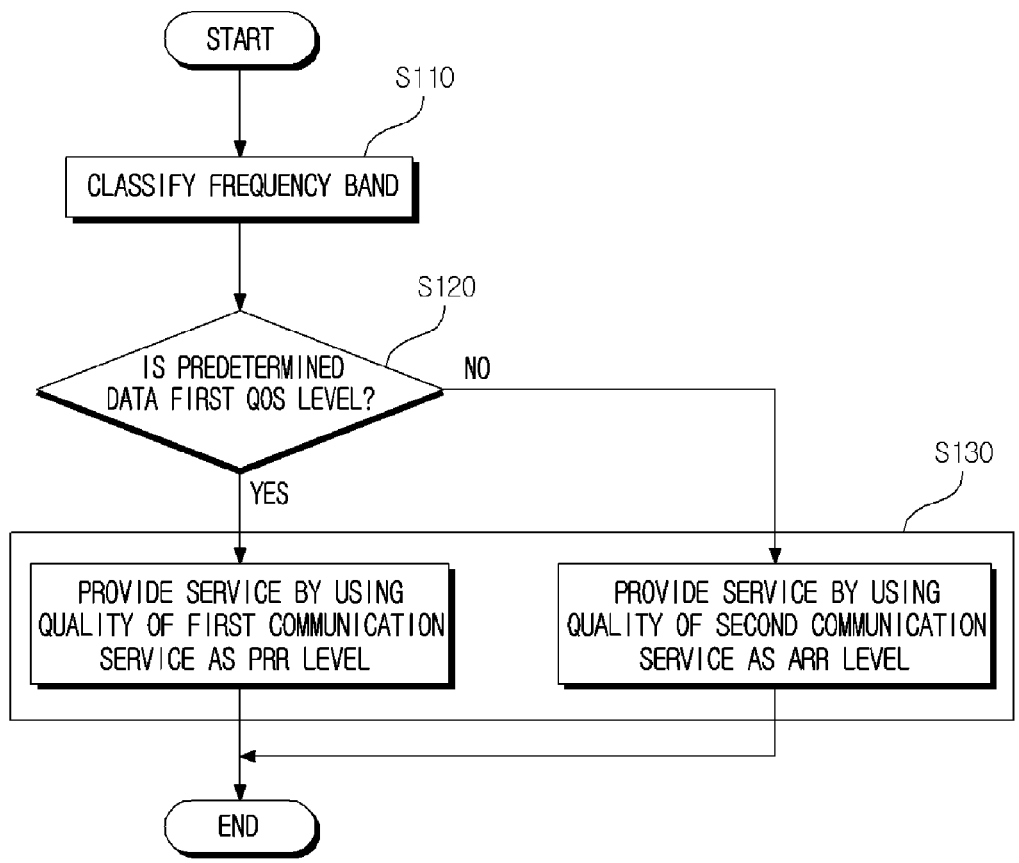

CARRIER AGGREGATION APPARATUS FOR EFFICIENTLY UTILIZING FREQUENCY RESOURCE OF LICENSE BAND AND SHAREABLE BANDS, AND OPERATION METHOD THEREOF

CROSS-REFERENCE TO RELATED APPLICATIONS

This application claims priority to and the benefit of Korean Patent Application No. 10-2012-0063963 filed on Jun. 14, 2012 and Korean Patent Application No. 10-2013-0035307 filed on Apr. 1, 2013 in the Korean Intellectual Property Office, the entire contents of which are incorporated herein by reference.

TECHNICAL FIELD

Exemplary embodiments relate to a carrier aggregation apparatus and an operation method thereof, and more particularly, to a carrier aggregation apparatus that classifies frequency resources based on quality of a frequency band and thereby allocates the classified frequency resources based on a required service characteristic, in the case of aggregating and thereby using a license band allocated to a cognitive radio cell and a shareable band secured through access to a cognitive radio database or spectrum sensing, and an operation method thereof.

BACKGROUND ART

Currently, various types of wireless communication technologies, which are necessarily used in our daily lives, are in rapid development.

In particular, services using wireless communication such as radio frequency identification (RFID)/ubiquitous sensor network (USN), wireless broadband Internet (WiBro), and the like in addition to mobile communication, wireless local area network (WLAN), digital broadcasting, and satellite communication, are significantly increasing. Due to diversification of wireless communication service, which has had a sudden increase in development, and an increase in use thereof, a demand for limited frequency resources is increasing and a value thereof is also gradually increasing. To efficiently utilize such important electric wave resources, advanced countries are actively conducting an activity for developing a technology of efficiently utilizing the electric wave resources and establishing an electric wave policy based thereon.

In this regard, proposed is a cognitive radio (CR) capable of sensing an idle frequency, which is allocated but is not actually used, and efficiently sharing and thereby using the sensed idle frequency.

The cognitive radio indicates a technology that automatically finds an unused frequency based on a region and time, and enables targeted communication while protecting a permitted neighboring radio station. By finding an idle spectrum that is widely dispersed over various widths and of which occupancy time continuously varies, and by determining a frequency bandwidth, output, a modulation scheme, and the like suitable for an environment of the found idle spectrum, and thereby enabling the found idle spectrum to be reutilized, it is possible to increase efficiency of frequency that is a limited resource. The Institute of Electrical and Electronics Engineers (IEEE) has been implementing a technology standardization using a cognitive radio (CR) of television (TV) frequency band since 2004.

SUMMARY OF THE INVENTION

An exemplary embodiment has been made in an effort to provide a carrier aggregation apparatus that classifies frequency resources based on quality of a frequency band and thereby allocates the classified frequency resources based on a required service characteristic, in the case of aggregating and thereby using a license band allocated to a cognitive radio cell and a shareable band secured through access to a cognitive radio database or spectrum sensing, and an operation method thereof.

An exemplary embodiment provides a carrier aggregation apparatus, including: a level assignment manager configured to perform management by classifying a license band allocated to a cognitive radio cell into a primary radio resource (PRR) level, and by classifying a shareable band obtained through a cognitive radio database or spectrum sensing into an auxiliary radio resource (ARR) level; a determiner configured to determine a quality of service (QoS) level of a communication service provided to the cognitive radio cell; and a service provider configured to allocate a frequency resource of the PRR level when the QoS level requires a first communication service, and to allocate a frequency resource of the ARR level when the QoS level requires a second communication service lower than the first communication service.

Another exemplary embodiment provides a carrier aggregation apparatus, including: a level assignment manager configured to perform management by classifying a license band allocated to a cognitive radio cell and a shareable band obtained through a cognitive radio database or spectrum sensing into a PRR level and by classifying a shareable band into an ARR level based on frequency quality; a determiner configured to determine a QoS level of a communication service provided to the cognitive radio cell; and a service provider configured to allocate a frequency resource of the PRR level when the QoS level requires a first communication service, and to allocate a frequency resource of the ARR level when the QoS level requires a second communication service lower than the first communication service.

Still another exemplary embodiment provides an operation method of a carrier aggregation apparatus, the method including: classifying a license band allocated to a cognitive radio cell and a shareable band obtained through a cognitive radio database or spectrum sensing into a PRR level, and classifying a shareable band into an ARR level based on frequency quality; determining a QoS level of a communication service provided to the cognitive radio cell; and allocating a frequency resource of the PRR level when the QoS level requires a first communication service, and allocating a frequency resource of the ARR level when the QoS level requires a second communication service lower than the first communication service.

According to exemplary embodiments, a carrier aggregation apparatus and an operation method thereof may expand frequency resource reutilization and a frequency band, may also provide a stable communication service, and may improve frequency quality by classifying a license band allocated to a cognitive radio cell and a shareable band obtained from a cognitive radio database into a PRR level and an ARR level and thereby performing management with respect to a service required from predetermined data transmitted from the cognitive radio cell, and by allocating a frequency resource of the PRR level or the ARR level based on frequency quality of a communication service required from the cognitive radio cell and thereby providing the communication service.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 is a flowchart illustrating an operation method of a carrier aggregation apparatus according to an exemplary embodiment.

Figure 1:
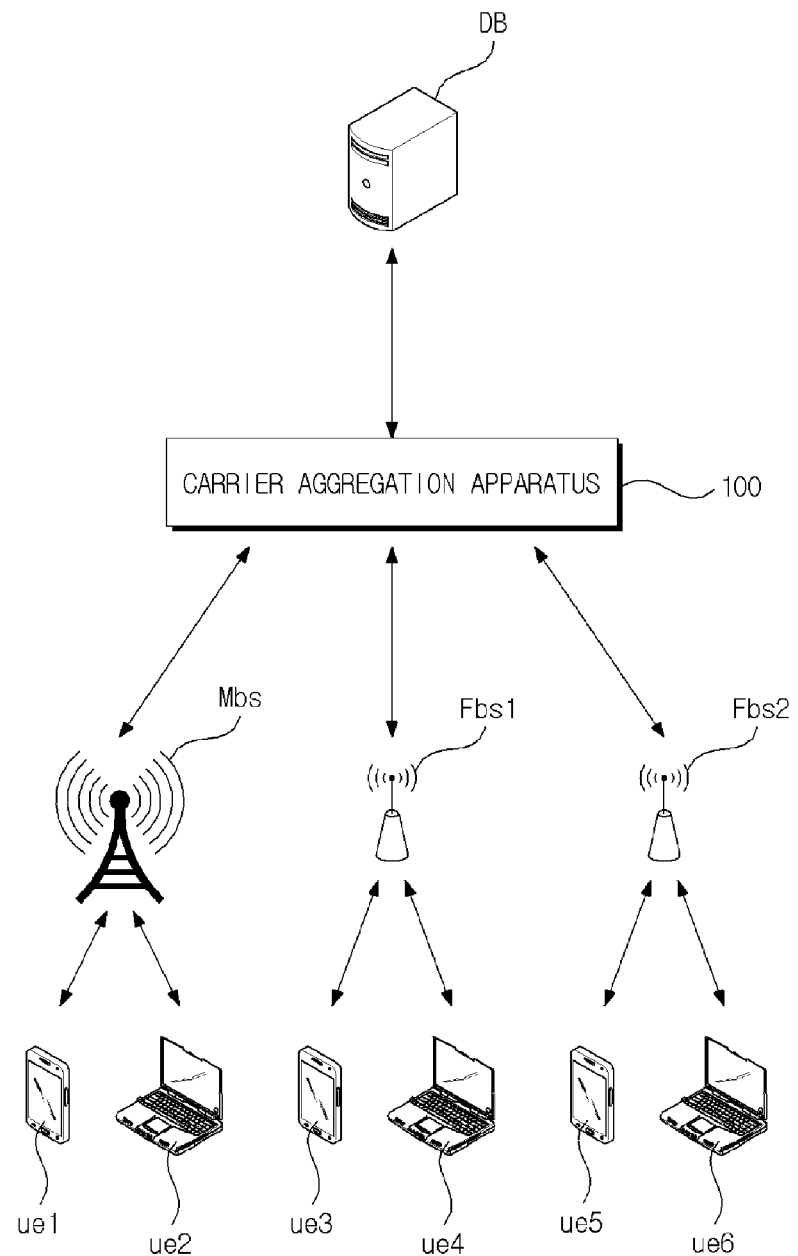
FIG. 1 is a diagram illustrating a communication system including a carrier aggregation apparatus according to an exemplary embodiment.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The following description simply exemplifies a principle of the invention. Accordingly, although not clearly described or illustrated in the present specification, those skilled in the art may configure the principle of the invention and may invent a variety of apparatuses included in the concept and scope of the invention. In addition, all of the conditional terminologies and exemplary embodiments enumerated in the present specification are clearly intended only for the purpose of understanding the concept of the invention, in principle. Accordingly, the invention should not be understood to be limited to the exemplary embodiments and states particularly enumerated as above.

All of the detailed descriptions in which a predetermined exemplary embodiment in addition to the principle of the invention, perspectives, and exemplary embodiments are described should be understood to include structural and functional equivalents of the above matters. The equivalents should be understood to include equivalents currently known and also include equivalents to be developed in the future, that is, all of the devices invented to perform the same function regardless of a type of structure.

Accordingly, for example, a block diagram of the present specification should be understood to indicate an exemplary conceptual perspective of embodying the principle of the invention. Similarly, all of the flowcharts, state conversion diagrams, pseudo codes, and the like, should be understood to indicate a variety of processes that can be expressed by a computer in a computer-readable medium, and that are implemented by the computer or a processor regardless of whether the computer or the processor is clearly illustrated.

Functions of various devices illustrated in the drawings that include the processor or a functional block indicated as a concept similar thereto may be provided by use of exclusive hardware and hardware having a capability of executing software in association with appropriate software. When such functions are provided by the processor, the functions may be provided by a single exclusive processor, a single shared processor, or a plurality of individual processors, and a portion thereof may be shared.

Clear use of the processor, control, or a terminology proposed as a concept similar thereto should not be interpreted by exclusively citing hardware having the capability of executing software, and should be understood to implicitly include ROM, RAM, and a nonvolatile memory for storing digital signal processor (DSP) hardware and software without limitation. Known and commonly-used other hardware may also be included.

In the claims of the present specification, a constituent element expressed as a means to perform a function disclosed in the detailed description is intended to include, for example, a combination of circuit devices configured to perform the function or all of the methods of performing the function that includes every type of software including firmware/microcode, and the like. The constituent element is combined with an appropriate circuit for executing the above software in order to perform the function. The invention defined by the claims is combined with functions provided by variously enumerated means and combined with a scheme required by the claims. Accordingly, any means capable of providing the function should be understood to be equivalent to as verified from the present specification.

The aforementioned objects, features, and advantages will become further obvious through the following detailed description which is associated with the accompanying drawings and accordingly, those skilled in the art may easily implement the technical spirit of the invention. When it is determined that the detailed description related to a related known function or configuration may make the purpose of the present invention unnecessarily ambiguous in describing the invention, the detailed description will be omitted herein.

Hereinafter, exemplary embodiments will be described in detail with reference to the accompanying drawings.

FIG. 1 is a diagram illustrating a cognitive radio communication system including a carrier aggregation apparatus 100 according to an exemplary embodiment.

Referring to FIG. 1, the cognitive radio communication system may include a plurality of terminals (ue1, ue2, ue3, ue3, ue4, ue5, and ue6), cognitive radio cells (Mbs, Fbs1, and Fbs2), the carrier aggregation apparatus 100, and a cognitive radio database (DB).

Although the exemplary embodiment describes that the plurality of terminals (ue1 to ue6) is smart phones, the plurality of terminals (ue1 to ue6) may be mobile communication terminals including a mobile phone, a notebook computer, a digital broadcasting terminal, a personal digital assistant (PDA), a portable multimedia player (PMP), a camera, navigation, a tablet computer, an e-book terminal, and the like, but the exemplary embodiment is not limited thereto.

The plurality of terminals (ue1 to ue6) may transmit data to the cognitive radio cells (Mbs, Fbs1, and Fbs2), and may receive response data corresponding to the data.

That is, the plurality of terminals (ue1 to ue6) may be provided with a communication service desired by a user from the cognitive radio cells (Mbs, Fbs1, and Fbs2) and the carrier aggregation apparatus 100, but the exemplary embodiment is not limited thereto.

Although the exemplary embodiment describes that the cognitive radio cells (Mbs, Fbs1, and Fbs2) include a single macro cell (Mbs) and two femto cells (Fbs1 and Fbs2), the exemplary embodiment is not limited thereto.

Here, each of the cognitive radio cells (Mbs, Fbs1, and Fbs2) may transmit and receive data to and from the plurality of terminals (ue1 to ue6) arranged within a predetermined area.

Each of the cognitive radio cells (Mbs, Fbs1, and Fbs2) may have a different shareable band obtained through access to the cognitive radio DB or spectrum sensing. The carrier aggregation apparatus 100 enables a license band allocated to the cognitive radio cells (Mbs, Fbs1, and Fbs2) and the shareable band to be simultaneously used.

Here, the license band includes a paired spectrum, and is used as a primary carrier of an uplink (UL) and a downlink (DL) using a frequency division duplexing (FDD) scheme. The shareable band includes an unpaired spectrum and is used as an auxiliary carrier of the UL or the DL using a time division duplexing (TDD) scheme.

Here, the carrier aggregation apparatus 100 may allocate, to each of the cognitive radio cells (Mbs, Fbs1, and Fbs2), a frequency resource utilized for the license band and the shareable band.

That is, the carrier aggregation apparatus 100 classifies the license band allocated to each of the cognitive radio cells (Mbs, Fbs1, and Fbs2) and the shareable band obtained through access to the cognitive radio DB or spectrum sensing, into a primary radio resource (PRR) level and an auxiliary radio resource (ARR) level based on a frequency band characteristic, determines an important quality of service (QoS) level based on a service provided from each of the cognitive radio cells (Mbs, Fbs1, and Fbs2), and provides a communication service by utilizing a frequency resource of the PRR level with respect to a service requiring relatively high reliability and priority and by utilizing a frequency resource of the ARR level with respect to a service requiring relatively low reliability and priority.

Accordingly, data allocated to the frequency resource of the PRR level is configured based on a service requiring high QoS or quality of experience (QoE), and is real-time data or security data. As an example, the data may be at least one of voice call data, video call data, security access data, control access data, and streaming data. The data is voice over Internet protocol (VoIP), video-conference, a streaming service, a control signal, and the like. Data allocated to the frequency resource of the ARR level is configured based on a service requiring low QoS or QoE, and is non-real-time data or non-security data. As an example, the data is a text, a file transfer protocol (FTP), an email, and the like.

However, in the case of the frequency resource of the PRR level and the frequency resource of the ARR level, a service having low QoS and QoE may be provided using the frequency resource of the PRR level and a service having high QoS and QoE may be provided using the frequency resource of the ARR level based on a priority required by the user.

Here, the carrier aggregation apparatus 100 may secure a frequency resource of the shareable band by classifying, based on frequency quality, a frequency resource of which frequency bandwidth is variable and is inconsecutive based on positions and times of the cognitive radio cells (Mbs, Fbs1, and Fbs2) through the cognitive radio DB or spectrum sensing.

A variable used to measure the frequency quality may be determined as at least one of a signal-to-noise ratio (SNR) of a frequency allocated to each of the license band and the shareable band, a frequency bandwidth, and a channel state, but the exemplary embodiment is not limited thereto.

Figure 2:
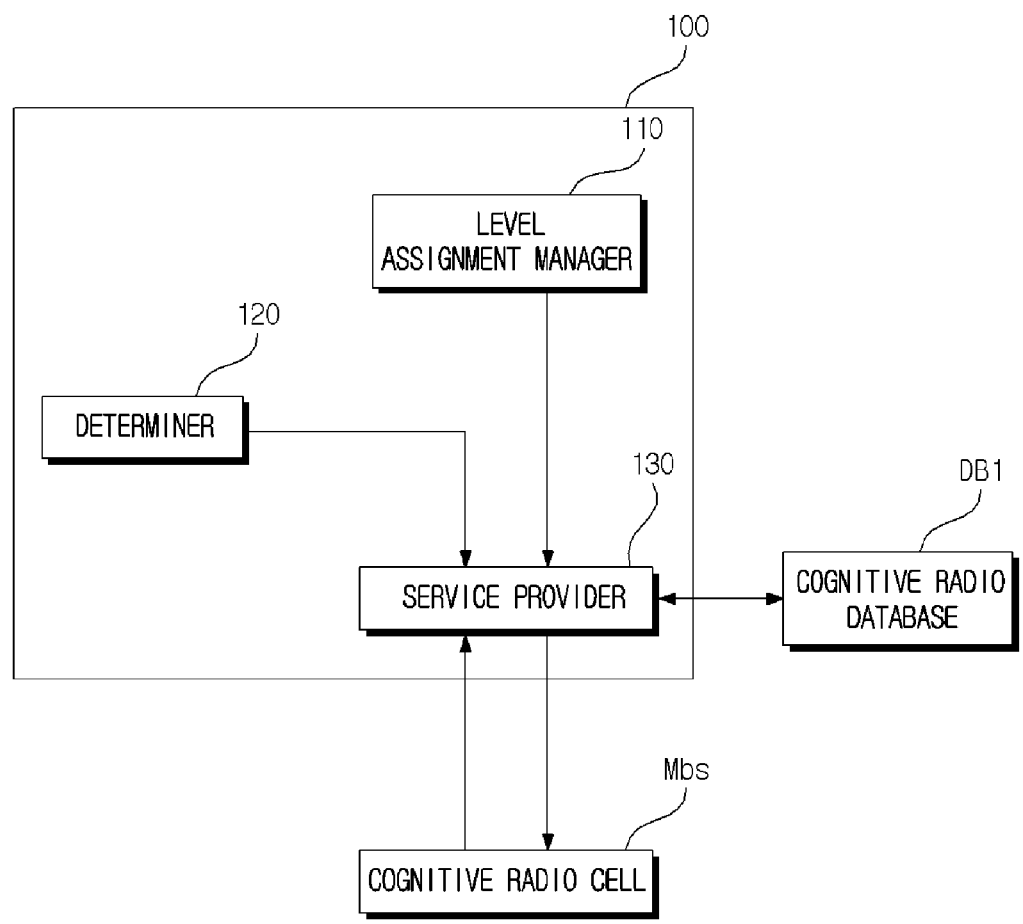
FIG. 2 is a block diagram illustrating a control configuration of the carrier aggregation apparatus according to an exemplary embodiment.

FIG. 2 is a block diagram illustrating a control configuration of the carrier aggregation apparatus 100 according to an exemplary embodiment.

Referring to FIG. 2, the carrier aggregation apparatus 100 may include a level assignment manager 110, a determiner 120, and a service provider 130.

Here, the level assignment manager 110 may perform management by classifying a license band allocated to a cognitive radio cell (Mbs, Fbs1, Fbs2) into a PRR level, and by classifying a shareable band obtained through a cognitive radio DB or spectrum sensing into an ARR level.

The level assignment manager 110 may perform management by classifying the license band allocated to the cognitive radio cell (Mbs, Fbs1, Fbs2) and the shareable band obtained through the cognitive radio DB or spectrum sensing into the PRR level and by classifying the shareable band into the ARR level based on frequency quality.

That is, the level assignment manager 110 may classify the license band into the PRR level and classify the shareable band into the ARR level, or may classify, into the PRR level, a band satisfying a predetermined reference band between the license band and the shareable band and may classify, into the ARR level, a band dissatisfying the reference band.

Although the exemplary embodiment describes that the level assignment manager 110 selects the band satisfying the reference band or the band dissatisfying the reference band from between the license band and the shareable band and thereby classifies the band into the PRR level or the ARR level, the exemplary embodiment is not limited thereto.

In the case of the license band allocated to the cognitive radio cell (Mbs) and the shareable band, when frequency quality of the license band is higher than frequency quality of the shareable band, the level assignment manager 110 may classify the license band into the PRR level and classify the shareable band into the ARR level. When the frequency quality of the shareable band is higher than the frequency quality of the license band, the level assignment manager 110 may classify the shareable band into the PRR level and classify the license band into the ARR level. The PRR level and the ARR level may be changed at predetermined time or in real time, but the exemplary embodiment is not limited thereto.

As described above, the level assignment manager 110 may use the license band as the predetermined reference band, and may change the reference band with a different band, but the exemplary embodiment is not limited thereto.

Here, the PRR level is a level for providing a first communication service that has high service reliability and user demand priority, requires high security, and also requires a real-time service. The ARR level is a level for providing a second communication service that has low service reliability and user demand priority, does not require security, and requires a non-real-time service.

In other words, the PRR level provides network performance, QoS, and OoE higher than the ARR level.

The level assignment manager 110 may determine a detailed transmission method of a radio frequency (RF) layer, a physical (PHY) layer, a media access control (MAC) layer, and a radio link control (RLC) layer based on a frequency characteristic and environment obtained in the PRR level and the ARR level.

In the case in which predetermined data transmitted from the cognitive radio cell (Mbs) is transmitted from the service provider 130, when the predetermined data is real-time data or security data, the determiner 120 may determine that the QoS level is a first QoS level requiring the first communication service. Alternatively, when the predetermined data is non-real-time data or non-security data, the determiner 120 may determine that the QoS level is a second QoS level requiring quality of the second communication service.

Accordingly, the determiner 120 may transmit the determined result to the service provider 130.

Here, the real-time data or security data may include at least one of voice call data, video call data, security access data, control access data, and streaming data, and the non-real-time data or non-security data may include at least one of text data and e-mail data.

In this instance, relatively low priority is set for the non-real-time data or non-security data compared to the real-time data or security data, but an exemplary embodiment is not limited thereto.

When the predetermined data requires the quality of the first communication service based on the determined result of the determiner 120, the service provider 130 may provide the communication service to the cognitive radio cell (Mbs) by using, as the PRR level, an FDD based reserved scheme. When the predetermined data requires the quality of the second communication service, the service provider 130 may provide the communication service to the cognitive radio service (Mbs) by using, as the ARR level, a TDD based contention scheme.

A carrier aggregation apparatus according to an exemplary embodiment may provide a communication service based on a level set for predetermined data that is provided from a cognitive radio cell or a user terminal and thus, may improve the efficiency of allocated resource. The carrier aggregation apparatus may determine a detailed transmission method suitable for an RF layer, a PHY layer, a MAC layer, and an RLC layer based on a selected frequency resource level and thereby further improve frequency resource use efficiency.

FIG. 3 is a flowchart illustrating an operation method of the carrier aggregation apparatus 100 according to an exemplary embodiment.

FIG. 3 describes an example in which the level assignment manager 110 classifies a PRR level and an ARR level based on a licensed band between the license band and a shareable band, but an exemplary embodiment is not limited thereto.

Referring to FIG. 3, the carrier aggregation apparatus 100 classifies a license band allocated to a cognitive radio cell (Mbs, Fbs1, or Fbs2) and a shareable band obtained from a cognitive radio DB into a PRR level and an ARR level (S110), determines a QoS level of predetermined data transmitted from the cognitive radio cell (Mbs, Fbs1, or Fbs2) (S120), provides a service using the PRR level when the QoS level is quality of a first communication service, and provides the service to the cognitive radio cell (Mbs, Fbs1, or Fbs2) using the ARR level when the QoS level is quality of a second communication service lower than quality of a first communication service (S130).

That is, the level assignment manager 110 may perform management by classifying the license band allocated to the cognitive radio cell (Mbs, Fbs1, or Fbs2) and the shareable band obtained through the cognitive radio DB or spectrum sensing into the PRR level and by classifying the shareable band into the ARR level based on frequency quality.

The level assignment manager 110 may classify the license band as the PRR level and classify the shareable band into the ARR level, or may classify, into the PRR level, a band satisfying a predetermined reference band between the license band and the shareable band and may classify, into the ARR level, a band dissatisfying the reference band. In the case in which predetermined data transmitted from the cognitive radio cell (Mbs) is transmitted from the service provider 130, when the predetermined data is real-time data or security data, the determiner 120 may determine that the QoS level is a first QoS level requiring quality of the first communication service. Alternatively, when the predetermined data is non-real-time data or non-security data, the determiner 120 may determine that the QoS level is a second QoS level requiring quality of the second communication service. Accordingly, the determiner 120 may transmit the determined result to the service provider 130.

When the predetermined data requires the quality of the first communication service based on the determined result of the determiner 120, the service provider 130 may provide the communication service to the cognitive radio cell (Mbs) by using, as the PRR level, an FDD based reserved scheme. When the predetermined data requires the quality of the second communication service, the service provider 130 may provide the communication service to the cognitive radio service (Mbs) by using, as the ARR level, a TDD based contention scheme.

A carrier aggregation apparatus according to an exemplary embodiment may be used to develop a CR communication technology using an ultra high frequency (UHF) TV whitespace, but the exemplary embodiment is not limited thereto.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A carrier aggregation apparatus, comprising:
   a level assignment manager configured to perform management by classifying a license band allocated to a cognitive radio cell into a primary radio resource (PRR) level, and by classifying a shareable band obtained through a cognitive radio database or spectrum sensing into an auxiliary radio resource (ARR) level;
   a determiner configured to determine a quality of service (QoS) level of a communication service provided to the cognitive radio cell; and
   a service provider configured to allocate a frequency resource of the PRR level when the QoS level requires a first communication service, and to allocate a frequency resource of the ARR level when the QoS level requires a second communication service lower than the first communication service,
   wherein the service provider, based upon a priority required by a user, is configured to alternatively provide the second communication service using the frequency resource of the PRR level and to provide the first communication service using the frequency resource of the ARR level.

2. The apparatus of claim 1, wherein the determiner determines that the QoS level is a first QoS level when a communication service provided from the cognitive radio cell is real-time data or security data, and determines that the QoS level is a second QoS level when the communication service is non-real-time data or non-security data.

3. The apparatus of claim 1, wherein
the determiner determines that the QoS level is a first QoS level when a communication service required by the cognitive radio cell is real-time data or security data, and
the real-time data or security data includes at least one of voice call data, video call data, security access data, control access data, and streaming data.

4. The apparatus of claim 1, wherein
the determiner determines that the QoS level is a second QoS level when a communication service required by the cognitive radio cell is non-real-time data or non-security data, and
the non-real-time data or non-security data includes at least one of text data and e-mail data.

5. The apparatus of claim 1, wherein the service provider provides the first communication service according to a frequency division duplexing (FDD) scheme in the case of allocating the frequency resource of the PRR level.

6. The apparatus of claim 1, wherein the service provider provides the second communication service according to a time division duplexing (TDD) scheme in the case of allocating the frequency resource of the ARR level.

7. A carrier aggregation apparatus, comprising:
a level assignment manager configured to perform management by classifying a license band allocated to a cognitive radio cell and a shareable band obtained through a cognitive radio database or spectrum sensing into a PRR level and by classifying a shareable band into an ARR level based on frequency quality;
a determiner configured to determine a QoS level of a communication service provided to the cognitive radio cell; and
a service provider configured to allocate a frequency resource of the PRR level when the QoS level requires a first communication service, and to allocate a frequency resource of the ARR level when the QoS level requires a second communication service lower than the first communication service,
wherein the service provider, based upon a priority required by a user, is configured to alternatively provide the second communication service using the frequency resource of the PRR level and to provide the first communication service using the frequency resource of the ARR level.

8. The apparatus of claim 7, wherein the level assignment manager classifies the license band and the shareable band into the PRR level and the ARR level by comparing frequency quality of the license band and frequency quality of the shareable band.

9. The apparatus of claim 8, wherein the frequency quality is determined using at least one of a signal-to-noise ratio (SNR) of a frequency allocated to each of the license band and the shareable band, a frequency bandwidth, and a channel state.

10. The apparatus of claim 8, wherein when the frequency quality of the license band is higher than the frequency quality of the shareable band, the level assignment manager classifies the license band into the PRR level and classifies the shareable band into the ARR level.

11. The apparatus of claim 8, wherein when the frequency quality of the shareable band is higher than the frequency quality of the license band, the level assignment manager classifies the shareable band into the PRR level and classifies the license band into the ARR level.

12. The apparatus of claim 7, wherein the PRR level provides network performance, quality of service (QoS), and quality of experience (QoE) higher than the ARR level.

13. An operation method of a carrier aggregation apparatus, the method comprising:
classifying a license band allocated to a cognitive radio cell and a shareable band obtained through a cognitive radio database or spectrum sensing into a PRR level, and classifying a shareable band into an ARR level based on frequency quality;
determining a QoS level of a communication service provided to the cognitive radio cell;
allocating a frequency resource of the PRR level when the QoS level requires a first communication service, and allocating a frequency resource of the ARR level when the QoS level requires a second communication service lower than the first communication service, and
based upon a priority required by a user, alternatively providing the second communication service using the frequency resource of the PRR level and to provide the first communication service using the frequency resource of the ARR level.

14. The method of claim 13, wherein the classifying classifies the license band and the shareable band into the PRR level and the ARR level by comparing frequency quality of the license band and frequency quality of the shareable band.

15. The method of claim 14, wherein the classifying classifies the license band into the PRR level and classifies the shareable band into the ARR level when the frequency quality of the license band is higher than the frequency quality of the shareable band.

16. The method of claim 14, wherein the classifying classifies the shareable band into the PRR level and classifies the license band into the ARR level when the frequency quality of the shareable band is higher than the frequency quality of the license band.

17. The method of claim 13, wherein the classifying determines the frequency quality based on network performance, QoS, and QoE of each of the license band and the shareable band.

18. The method of claim 13, wherein the determining determines that the QoS level is a first QoS level when a communication service provided from the cognitive radio cell is real-time data or security data, and determines that the QoS level is a second QoS level when the communication service is non-real-time data or non-security data.

19. The method of claim 18, wherein the providing provides the first communication service by allocating the frequency resource of the PRR level according to a frequency division duplexing scheme when the QoS level is the first QoS level, and provides the second communication service by allocating the frequency resource of the ARR level according to a time division duplexing scheme when the QoS level is the second QoS level.

20. The method of claim 13, wherein
the PRR level provides the communication service with respect to at least one of voice call data, video call data, security access data, control access data, and streaming data, and
the ARR level provides the communication service with respect to at least one of text data and e-mail data.

* * * * *